United States Patent
Wright et al.

[11] 4,054,879
[45] Oct. 18, 1977

[54] DUAL-FREQUENCY, REMOTE OCEAN-WAVE SPECTROMETER

[75] Inventors: John W. Wright, Accokeek, Md.; William J. Plant, Annandale; Dale L. Schuler, Springfield, both of Va.

[73] Assignee: The United States of America as represented by the Secretary of the Navy, Washington, D.C.

[21] Appl. No.: 743,372

[22] Filed: Nov. 19, 1976

[51] Int. Cl.² .............................................. G01S 9/02
[52] U.S. Cl. ................................................. 343/5 SA
[58] Field of Search ........................... 343/5 SA, 5 W

[56] References Cited

U.S. PATENT DOCUMENTS 3,719,946    3/1973    Sletten et al. ..................... 343/5 SA

OTHER PUBLICATIONS

D. Ross et al.; Laser & Microwave Observations of Sea-Surface Condition, etc; IEEE Transactions on Geoscience Electronics; Oct. 1970, vol. GE8, No. 4.
D. E. Weissman; Two Frequency Radar Interferometry applied to the Measurement, etc.; IEEE Transactions on Antenna & Propagation; Sept. 1973, vol. AP-21, No. 5.

*Primary Examiner*—T.H. Tubbesing
*Attorney, Agent, or Firm*—R. S. Sciascia; Philip Schneider; David G. Rasmussen

[57] ABSTRACT

A coherent, dual-frequency, ocean wave spectrometer radar system for measuring the characteristics of ocean surface gravity waves includes: a transmitter for transmitting a pair of closely spaced, coherently related, microwave frequencies; a receiver for receiving and separating the radar-return signals of the dual-frequency channels; a frequency shifter for offsetting the doppler spectrum of each radar return signal; and a multiplier for multiplying the radar-return signals of the dual-frequency channels to obtain a Bragg resonance condition indicating the presence of a particular gravity wave frequency on the ocean surface.

12 Claims, 9 Drawing Figures

AREAS OF STRONG BRAGG RESONANCE

SEA SURFACE

DUAL-FREQUENCY, REMOTE OCEAN-WAVE SPECTROMETER

BACKGROUND OF THE INVENTION

1. Field of the Invention

The invention relates to an ocean-wave spectrometer radar system for measuring the characteristics of gravity waves. More particularly, the invention relates to a coherent, dual-frequency, microwave radar in which the radar-return signals from the two frequency channels are multiplied and signal-processed to obtain gravity wave information.

2. Description of the Prior Art

Wave staffs, pressure sensors, current meters, cameras and laser profilometers have been used to measure the characteristics of ocean surface gravity waves having wavelengths of the order of meters and frequencies of the order of Hz or less. These methods all have deficiencies such as: disturbing the surface wave system; requiring deployment in awkward arrays to get directional information; operating in less than real time; and, in the case of the laser profilometer, requiring scanning through several directions.

Radar systems have also been used to measure ocean surface wave properties and have the advantage that they are remote sensing instruments. Single-frequency microwave radars have been used to measure capillary wave amplitudes (i.e., centimeter wavelengths), as well as certain properties of longer waves (e.g. sea state or significant wave height). These single-frequency radars have two main disadvantages when used to measure gravity-wave properties: they react to waves propagating in all directions; and they combine the effects of many wavelengths. A profile of the sea-surface reflectivity may be obtained with a high-resolution single-frequency radar; however, it does not selectively respond to a single-wavelength gravity wave propagating in a preferred direction. High-frequency (HF) radars have been used to measure properties of gravity waves but are limited in their operation due to their large antenna size and the restriction that they cannot operate freely in the broadcast band.

SUMMARY OF THE INVENTION

The present invention is an ocean-wave spectrometer radar system which utilizes radar reflections from capillary waves to measure the characteristics of gravity waves.

In general, the present invention recognizes that capillary waves are modulated by all frequencies of gravity waves on the water surface and that this modulation pattern propagates with the gravity-wave motion. This movement will cause a doppler shift in radar reflections from the capillary waves. Since the gravity-wave motion results from multiple gravity waves, the radar reflections will contain a spectrum of doppler frequencies.

From observing the spectrum of doppler frequencies, it is not possible to correlate the doppler frequencies with the gravity waves which caused them. It is, therefore, not possible to ascertain whether a specific-frequency gravity wave is present on the ocean surface. To accomplish this, the invention utilizes a second frequency channel to obtain a second doppler spectrum. This second frequency channel has a known frequency separation from the first channel. The doppler spectrums from each of the dual channels are filtered in a precorrelation filter and correlated in a multiplier. If a gravity wave is present on the ocean surface, which is related to the frequency separation of the dual channels, a Bragg resonance will occur when the doppler spectrums are multiplied. The resonance will indicate the frequency and other characteristics of the gravity wave.

Specifically, the system includes a continuous-wave, dual-frequency, microwave transmitter which transmits on two closely spaced frequency channels having a known frequency separation. A coherent receiver receives and separates the radar reflections from the two frequency channels. Since the radar system is coherent, a local oscillator signal is fed from the transmitter to the receiver. A frequency shifter is utilized to shift the local oscillator frequency by several hundred cycles. The purpose of this is to offset the doppler spectrum of the detected radar return for each channel from D.C. by several hundred cycles to prevent spectrum foldover. The two separated radar returns are fed to a precorrelation filter which passes a narrow band of doppler shifted radar returns from capillaries bunched near gravity wave crests. A multiplier receives the two filtered radar returns from the precorrelation filter and multiplies them.

If a spectral peak or resonance line is produced in the Fourier transform of the multiplied returns, this indicates that a gravity wave is present, possessing a wavelength that will satisfy a Bragg resonance condition for the specific frequency separation of the frequency channels. To observe this resonance line, the multiplier output is signal-processed in a spectrum analyzer which Fourier-transforms the output of the multiplier to provide a power spectrum and then averages a number of the power spectra to provide an output spectrum showing the resonance line caused by the gravity wave as well as a broad background spectrum.

A novel feature of the invention is the use of two closely spaced, coherent, transmission frequencies. Each different frequency separation is related to the Bragg resonance condition for a different-wavelength gravity wave.

A second novel feature of the invention is the use of a frequency shifter to shift the doppler spectrum of the detected radar-return signal for each channel several hundred cycles away from D.C. to prevent spectrum foldover.

A third novel feature is the use of a coherent receiver which preserves the relative phase of the radar returns of each frequency channel.

A fourth novel feature is the use of a precorrelation filter which passes a narrow band of doppler-shifted radar returns from capillaries near gravity wave crests. This discriminates against doppler-shifted returns that contribute little to the Bragg resonance peak but which increase the background.

A fifth novel feature of the invention is the multiplication of two radar returns to ascertain the presence of a gravity wave with a wavelength meeting the Bragg resonance condition for the specific frequency separation of the frequency channels.

DESCRIPTION OF THE PREFERRED EMBODIMENT

Figure 1:
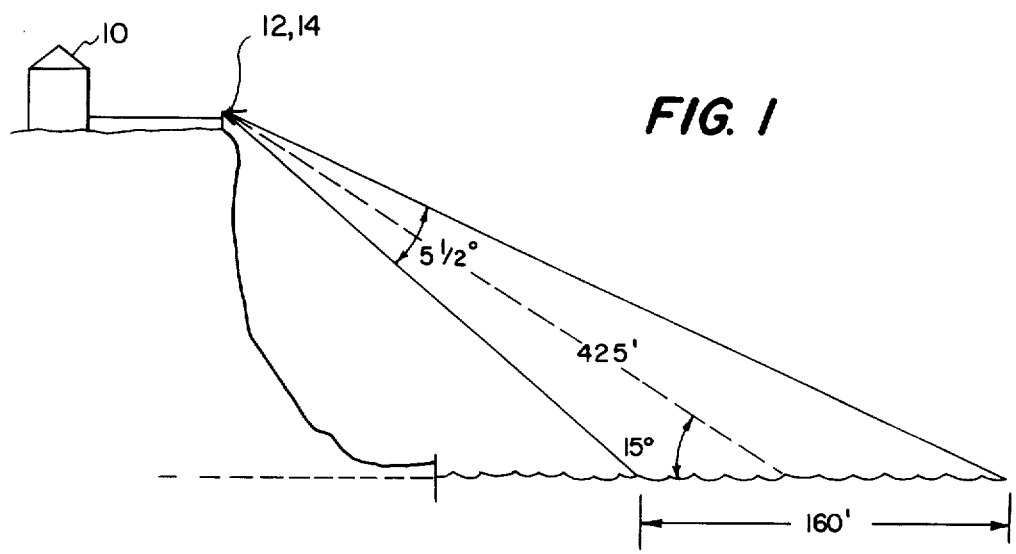
FIG. 1 is an elevation view of radar apparatus and dual transmitting and receiving antennas and their respective antenna patterns for the ocean-wave spectrometer radar system.

A system for measuring the characteristics of ocean surface gravity waves is outlined in FIG. 1. The transmitting and receiving apparatus of the system is housed in enclosure 10 which is on a hill overlooking the ocean surface. Antennas 12, 14 are remote from enclosure 10 and are shown as projecting their antenna patterns on the surface of the water. Antennas 12, 14 are the transmitting and receiving antennas, respectively. Both have the same antenna pattern which may be, for example, 5.5° wide and at an incidence angle of 15° to the water surface.

Figure 2:
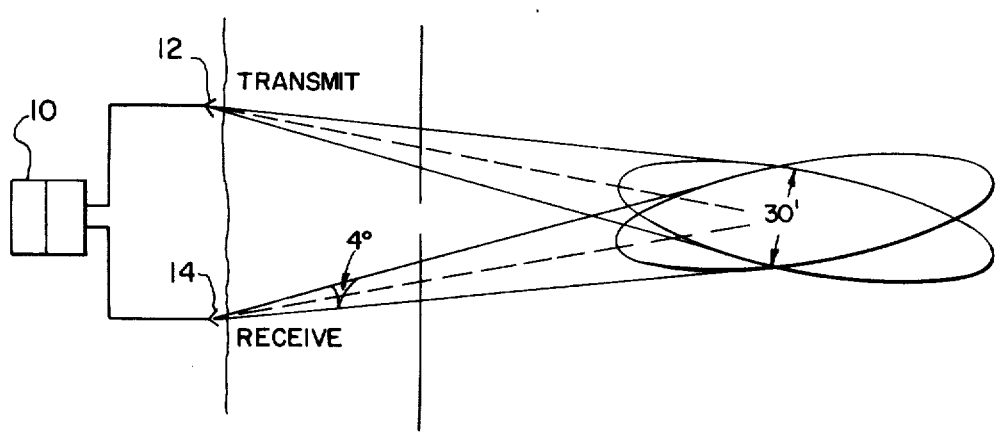
FIG. 2 is a plan view of the radar apparatus and dual receiving and transmitting antennas and their respective antenna patterns of FIG. 1.

FIG. 2 shows a top view of enclosure 10, antenna 12, and its associated beam pattern for transmitting, and antenna 14 and its associated beam pattern for receiving. The antenna patterns for antennas 12, 14 may be 4° in width and overlap at the surface of the water to ensure a maximum radar-return signal. The antennas are separated, for example, by 36 feet, to provide isolation from direct signal feedthrough.

Figure 3:
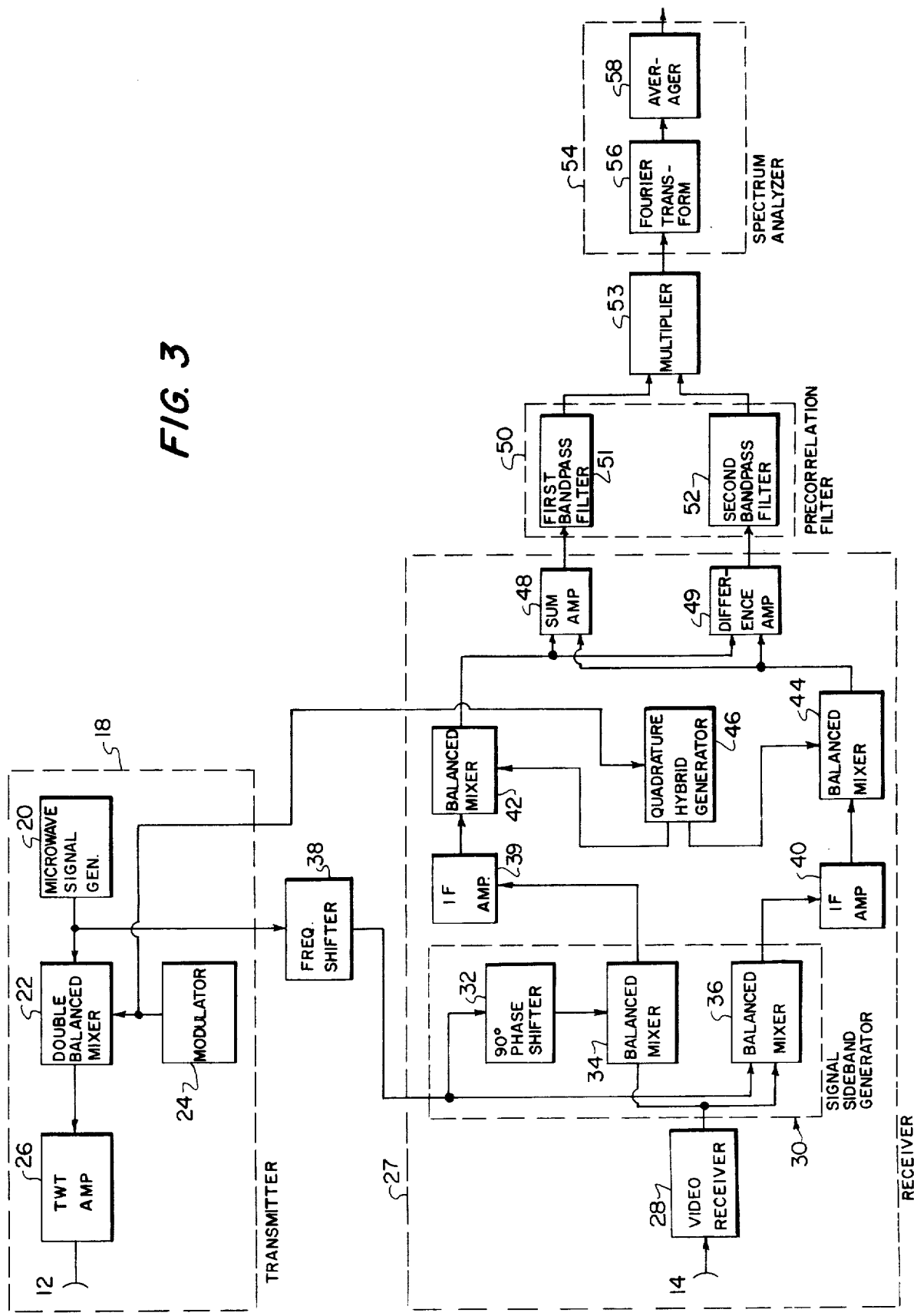
FIG. 3 is a schematic block diagram of the ocean-wave spectrometer radar system.

FIG. 3 is a schematic view of the ocean-wave spectrometer radar system. A transmitter 18 is used to generate two microwave frequencies, preferably at X band, with a known and variable frequency separation. Specifically, transmitter 18 includes a microwave signal generator 20, for example, an LFE (Laboratory for Electronics) Model 814-X-1, which generates a continuous-wave, X-band frequency of 9300 MHz. This frequency is directed to a double balanced mixer 22, for example, an EM Laboratories Model X142LTI. Double balanced mixer 22 additionally receives an input frequency in the range of 3.5 MHz to 75 MHz from modulator 24. The X-band signal is modulated by the modulator signal and the resultant signal generated by double balanced mixer 22 is two sideband frequencies separated by twice the input frequency from modulator 24. The center frequency from signal generator 20 is suppressed. The desired frequency separation for the two sideband frequency channels is controlled by selecting the appropriate modulator frequency between 3.5 MHz and 75 MHz. Modulator 24 may be a Hewlett Packard Frequency Synthesizer Model 8660B. The two sideband frequencies are fed to a traveling wave tube (TWT) amplifier 26 which amplifies the frequencies and forwards them for transmission to antenna 12, which may be a parabolic dish antenna two feet in diameter.

A composite radar-return signal containing the two transmitted sideband frequency channels plus intelligence imparted to the sideband frequency channels by the surface of the water is received by coherent receiver 27 through antenna 14, which may be identical to antenna 12, and passed to video receiver 28, for example, an Aertech Model A7001, which acts as a sensitive pre-amplifier for the weak return signals.

In general, the receiver circuitry after video receiver 28 is a conventional phase-matching circuit using two stages of IF and sum and difference circuits to beat down the sideband frequencies and separate the radar returns of the two frequency channels while still maintaining their phase relationship.

More specifically, the output of video receiver 28 is fed to single-sideband generator 30 whose purpose is to beat both frequencies of the radar return signal down to first IF signals. Single-sideband generator 30 includes a 90° phase shifter 32 and balanced mixers 34, 36, all three of which may, for example, be a Microwave Development Laboratories Model 906S76-1. The signal from video receiver 28 is fed to balanced mixers 34, 36. The latter balanced mixers also receive local oscillator signals from microwave signal generator 20 via frequency shifter 38. Frequency shifter 38 is a resonant cavity using a rotating dipole to shift the local oscillator frequency by several hundred Hz, preferably 400 Hz. As will be explained subsequently, this shift will cause the frequency channels to be beat down to a 400 Hz reference rather than D.C. This means the doppler spectrum of each frequency channel will be referenced about 400 Hz thus preventing spectrum foldover.

The shifted local oscillator frequency is fed directly to balanced mixer 36, and through 90° phase shifter 32 into balanced mixer 34. The outputs of balanced mixers 34, 36 are the first IF signals. These signals are fed through IF amplifiers 39 and 40 to balanced mixers 42, 44, for example, Hewlett Packard Model HP10514 double balanced mixers. Balanced mixers 42, 44 also receive the output of modulator 24 through quadrature hybrid 46, for example, a Merimac Model QH-7. Quadrature hybrid 46 generates one signal in phase with its input and one signal 90° out of phase. The modulator signal beats the first IF signals in balanced mixers 42, 44 down to second IF frequencies of 400 Hz. The outputs of balanced mixers 42, 44 are then fed in parallel to sum amplifier 48 and difference amplifier 49 whose outputs are the doppler spectra of the sideband-frequency channels centered about 400 Hz.

These signals are sent to precorrelation filter 50 which passes only doppler-shifted radar returns from localized, fast-moving capillaries bunched near the gravity wave crests. This discriminates against doppler-shift returns that contribute little to the Bragg resonant peak but increase the background. The precorrelation filter is composed of first and second bandpass filters 51 and 52 which receive the outputs of sum and difference amplifiers 48, 49, respectively. The outputs from first and second bandpass filters 51, 52 are sent to multiplier 53, for example, a Princeton Applied Research Model 193, where the signals are multiplied. The output of the multiplier is fed to a spectrum analyzer 54, for example, a Nicolet Scientific Model UA-500A Fourier analyzer. Spectrum analyzer 54 includes: A Fourier transformer 56 which provides a power spectrum of the output of multiplier 53 and an averager 58 which will average sample spectra over a period of time. The spectrum analyzer, for example, will develop one normalized sample spectrum from 0–10 Hz in about 50 seconds and average about 10 of the sample spectra to get the output spectrum.

Figure 4:
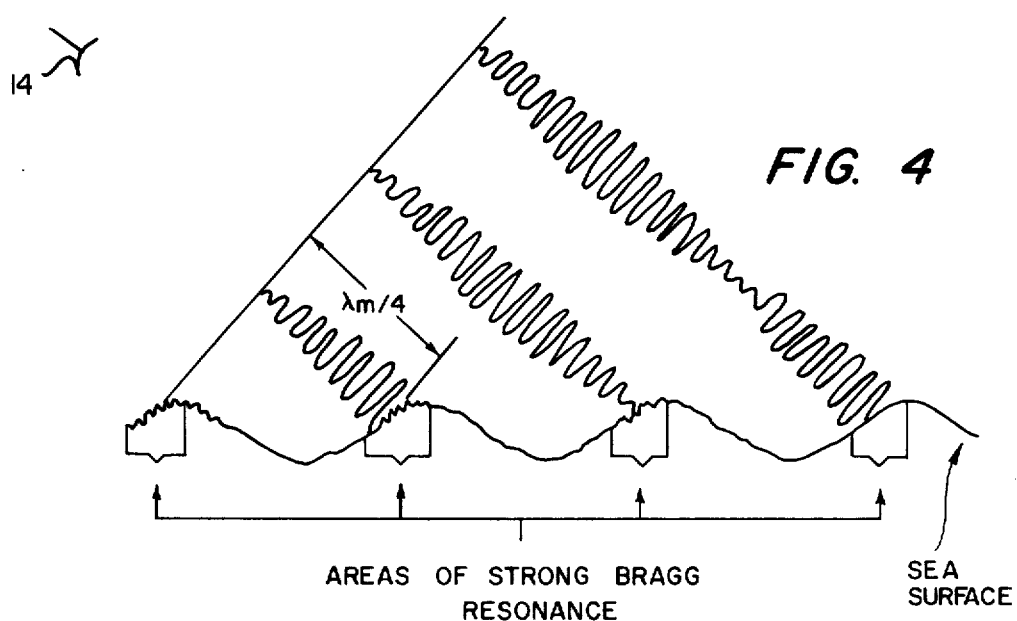
FIG. 4 is a diagrammatic illustration of the Bragg resonance condition for both capillary and gravity waves.

FIG. 4 illustrates the Bragg resonance conditions for both capillary and gravity waves. Bragg resonance means that radar returns at a particular grazing angle to the water surface, backscattered from a particular periodic wave structure, are in phase along a planar front and are received in phase at antenna 14. Examining the Bragg response condition for capillary waves, the dual frequency channels each receive radar returns primarily as a result of firstorder Bragg scattering due to small capillary waves, shown in FIG. 4 as areas producing strong backscattered returns. The two transmitted frequencies are very close and hence have the same Bragg resonance which is defined by the relation:

$$(2\pi/\lambda C) = 4\pi (f_{transmitter}/C) \cdot \cos \theta \qquad (1)$$

where $\theta$ is the grazing angle
C is the speed of light
$\lambda_C$ is the wavelength of the capillary waves.

The Bragg resonance is apparent for capillary waves because the radar returns from the capillary waves are in phase and add.

Looking at the Bragg resonance condition for gravity waves, it is first noted that the capillary wave amplitudes are modulated by the gravity waves and that the modulation pattern moves with the gravity waves. This movement causes a spectrum of doppler shifts in the radar returns from the capillary waves.

To illustrate this, a stationary target would generate a radar return with no doppler shift, which would show up as a spike at 400 Hz (i.e., the offset frequency). Capillary waves moving with their characteristic propagation velocity would be doppler-shifted and the radar return would show up centered about a frequency of, for example, 380 Hz. Because all of the gravity waves advect the capillaries and modulate their velocity causing different doppler shifts, the radar return would not be a single spike but would be a broad spectrum centered about 380 Hz. Such a doppler spectrum would not permit the doppler shift for a specific gravity-wave frequency to be picked out.

To determine such a gravity-wave frequency, the precorrelation filter outputs from each channel are beast together in multiplier 53, shown in FIG. 3. If a Bragg resonance occurs, this indicates the presence of a gravity wave at the same frequency as the resonance. The Bragg resonance is possible because coherent detection in the receiver preserves relative phases of the signals in both channels. The Bragg resonance condition for gravity waves is as follows:

$$(2\pi/\lambda_g) = 4\pi (\Delta f/C) \cos \theta \qquad (2)$$

where $\theta$ is the grazing angle
C is the speed of light
$\Delta f$ is the frequency separation of the channels
$\lambda_g$ is the wavelength of the gravity waves.

Figure 5:
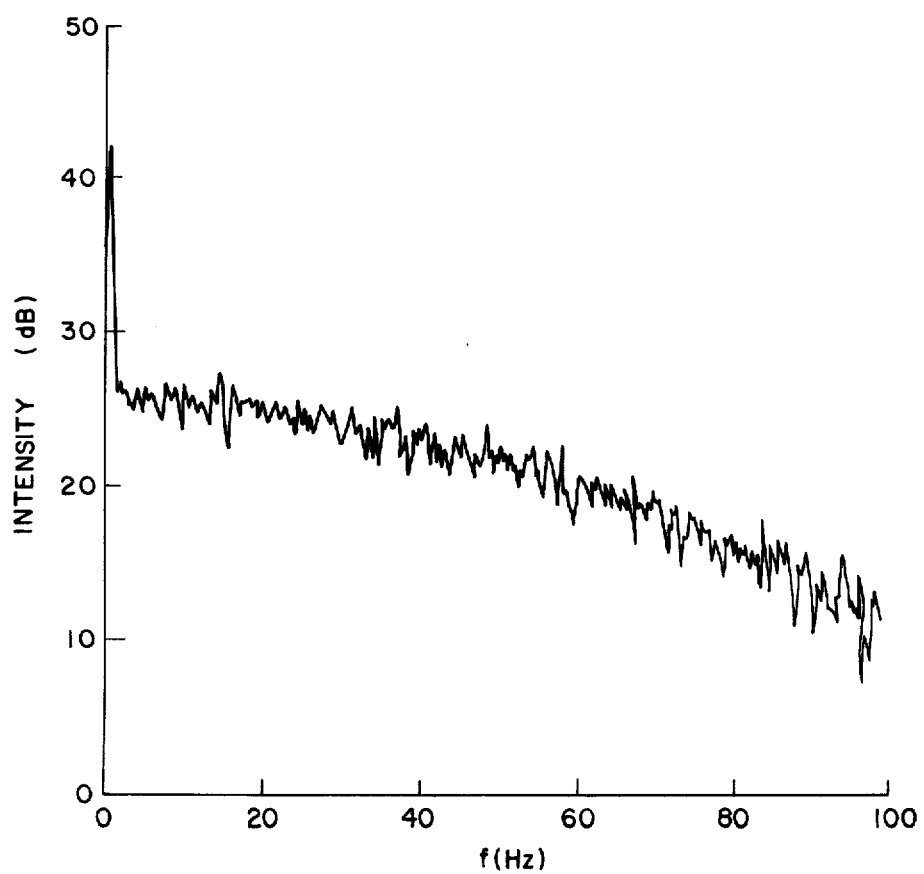
FIG. 5 is a graph of the output of the spectrum analyzer shown in FIG. 3.
Figure 6:
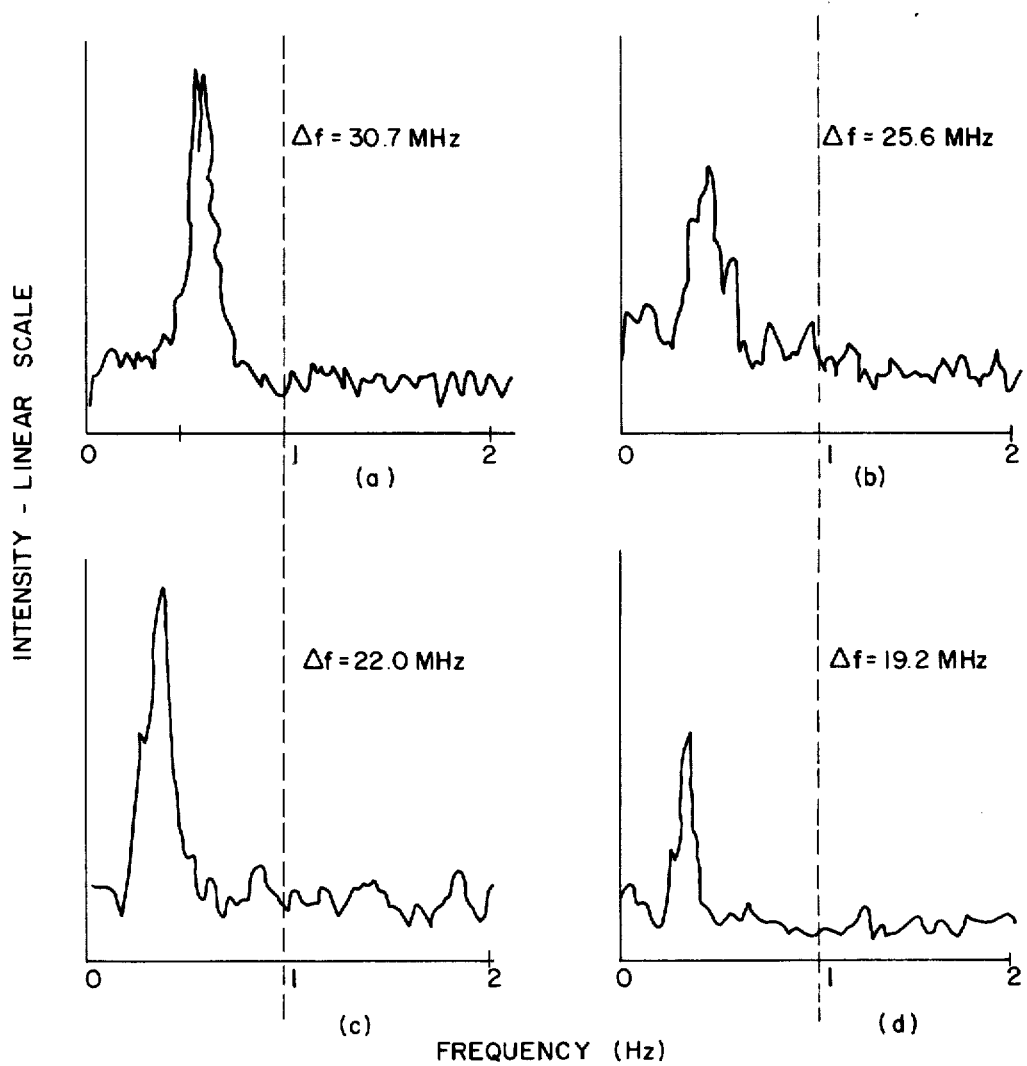
FIGS. 6(a)-(d) are a set of four graphs of the output of the spectrum analyzer over a 0-2 Hz frequency range for four values of frequency separation between the frequency channels.

FIG. 5 shows the output (i.e., power spectrum) of spectrum analyzer 54 of FIG. 3. The prominent line at about 0.5 Hz represents a periodic signal of 0.5 Hz. This frequency indicates that a gravity wave of 0.5 Hz frequency was detected as a result of the multiplication of the radar returns in multiplier 52.

FIGs. 6(a) through 6(d) each show an expanded view of a frequency segment of 0-2 Hz similar to that from the graph of FIG. 5. FIGS. 6(a)-(d) represent averaged spectrum outputs from data taken using four different frequency separations of the sideband frequency channels. It is observed that, as the frequency separation decreases from FIG. 6(a) to FIG. 6(d), the prominent peaks shift to a lower frequency, indicating that gravity waves of lower frequency are present on the ocean surface.

In operation, microwave signal generator 20 generates a center frequency of 9300 MHz which is fed to double balanced mixer 22 which also receives a frequency in the range of 3.5 - 75 MHz from modulator 24 depending on the desired gravity-wave frequency to be examined. In double balanced mixer 22, two sidebands are generated and the center frequency is suppressed. The frequency separation between the sidebands will be from 7-150 MHz which is twice the modulator frequency. The two sideband frequencies are amplified by traveling wave tube 26 and transmitted through antenna 12.

The reflected radar returns are received by antenna 14 and fed to video receiver 28 which in turn forwards the signal to balanced mixers 34, 36. Balanced mixer 34 additionally receives the local oscillator signal shifted in frequency by 400 Hz by frequency shifter 38 and phase-shifted by 90° by phase shifter 32. Balanced mixer 36 additionally receives the 400 Hz shifted local oscillator frequency. The first IF outputs of balanced mixers 34, 36 are 90° out of phase because of the phase shift in phase shifter 32. This phase shift is necessary for the phase-matching operation of the receiver. The purpose for detecting and separating the radar returns from the two channels using the coherent phase-matching technique rather than incoherent detection is to preserve the phases of the radar-return signals in both channels. This phase preservation allows the signals to be coherently processed by the multiplier and hence obtain a Bragg resonance as will be explained subsequently.

IF amplifiers 39, 40 receive the first IF signals from balanced mixer 34 and 36, respectively, and pass the signal to balanced mixers 42, 44 where the second IF signals of 400 Hz are generated. To accomplish this, balanced mixers 42, 44 receive a second local oscillator frequency from modulator 24 through quadrature hybrid 46. Quadrature hybrid 46 shifts by 90° the local oscillator frequency to balanced mixer 42.

The 400 Hz second IF signals out of balanced mixers 42, 44 are the difference and sum, respectively, of the returns of the two frequency channels. These are both forwarded in parallel to sum and difference amplifiers 48, 49 which complete the phase-matching circuit and separate the radar-return signals for both channels while still maintaining their phase relationship. The output of the summing amplifier 48 is the upper sideband signal beat down to 400 Hz. Similarly, the output of the difference amplifier 49 is the lower sideband signal beat down to 400 Hz. Each of these radar return signals is composed of a spectrum of doppler frequencies nearly centered about the 400 Hz reference. This shows up as a widening of the 400 Hz reference by typically 50-100 Hz at the 3 db points. The various doppler components result from the advection of the capillary waves by difference gravity waves on the ocean surface.

The radar returns from the sum and difference amplifiers 48, 49 are filtered by bandpass filters 51 and 52 which filter out all doppler components except those from fastmoving capillaries bunched near gravity-wave crests. This will enhance the Bragg resonance peak and reduce the background. Although first and second bandpass filters 51, 52 may be deleted, performance of the system is significantly enhanced with the filters.

The outputs of first and second bandpass filters 51, 52 are fed to multiplier 53 where the signals are multiplied together.

The high-frequency components are filtered and the presence of a Bragg resonance line indicates that a gravity wave related to the frequency separation of the frequency channels is present on the ocean surface.

The output of multiplier 53 is fed to spectrum analyzer 54 which Fourier-transforms the output in Fourier transmformer 56 to provide a frequency spectrum. The frequency spectrum is then fed to an averager 58 which will normally average about 10 spectra. Such averaged spectra are shown in FIGS. 5 and 6a–6d. If a peak is found in the spectrum, this indicates that a gravity wave of the appropriate frequency is present on the ocean surface.

To determine the presence of other gravity waves having different frequencies the entire process is repeated using different frequency separations of the frequency channels. In this way an entire spectrum of ocean surface gravity waves may be obtained.

The wave spectrometer provides new information about the properties of wind-generated, surface-water-wave systems. In particular, the following measurements are possible:

a. The gravity wave dispersion relationship for both deep and shallow water conditions;

b. The directional gravity-wave-modulation power spectrum;

c. The dominant wavelength, frequency, and direction of a water-wave system; and d. The advection of gravity waves by longer waves and by surface water currents.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. An ocean-wave spectrometer radar system comprising:

transmitter means, having closely spaced, coherently related, dual-frequency channels, for generating a first local-oscillator frequency and for transmitting a pair of closely spaced microwave frequencies:

coherent receiver means for receiving and separating the radar returns of said transmitter dual-frequency channels;

frequency-shifter means connected to said transmitter means and said receiver means for shifting the frequency of said first local-oscillator frequency; and multiplier means receiving said separated radar returns from said receiver and multiplying said separated radar returns to obtain a Bragg resonance condition.

2. The system of claim 1 including a precorrelation filter connected between said coherent receiver means and said multiplier means for passing a narrow band of doppler-shifted radar returns from capillaries bunched near gravity-wave crests.

3. The radar system of claim 2, including spectrum analyzer means receiving the output of said multiplier for Fourier-transforming and averaging said multiplier output to produce a power spectrum.

4. An ocean-wave spectrometer radar system comprising:

trnasmitter means, having closely spaced, coherently related, dual-frequency, transmitter channels and including a microwave signal generator, for transmitting a pair of closely spaced microwave frequencies and generating a first local-oscillator frequency;

coherent receiver means, including phase-matching circuitry, for receiving and separating radar returns from said transmitter dual-frequency channels;

frequency shifter means connected to said microwave signal generator and said phase-matching circuitry, for shifting the frequency of said first local-oscillator frequency; and multiplier means for receiving said separated radar returns from said receiver and multiplying said separated radar returns.

5. The system of claim 4, including a precorrelation filter connected between said phase-matching circuitry and said multiplier for passing a narrow band of doppler-shifted radar returns from capillaries bunched near gravity-wave crests.

6. The radar system of claim 5, including spectrum analyzer means for receiving the output of said multiplier for averaging and Fourier-transforming said multiplier output to produce a power spectrum.

7. An ocean-wave spectrometer radar system comprising:

transmitter means, having closely and variably spaced, coherently related, dual-transmitter channels and including a microwave signal generator, for transmitting a pair of closely and variably spaced microwave frequencies and generating a first local-oscillator frequency;

coherent receiver means, including phase-matching circuitry, for receiving and separating radar returns from said transmitted dual-frequency channels;

frequency shifter means connected to said microwave signal generator and said phase-matching circuitry for shifting the frequency of said first local-oscillator frequency; and multiplier means for receiving said separated radar returns from said receiver and multiplying said separated radar returns.

8. The system of claim 7, including a precorrelation filter connected between said phase-matching circuitry and said multiplier for passing a narrow band of doppler-shifted radar returns from capillaries bunched near gravity-wave crests.

9. The system of claim 8, in which said precorrelation filter includes a pair of bandpass filters each receiving a different one of the separated radar returns from said phase-matching circuitry.

10. The system of claim 9, in which said transmitter includes:

modulator means for generating a variable modulating frequency;

double balanced mixer means, receiving the output of said microwave frequency generator and said modulating frequency, for generating a pair of variably and closely spaced transmitter frequencies and suppressing said microwave frequency.

11. The system of claim 10, in which said phase-matching circuitry includes:

single sideband generator means receiving said radar returns and said first local oscillator frequency, for producing a first intermediate frequency in phase with said radar returns and another first intermediate frequency 90° out of phase with said radar returns;

quadrature hybrid generator means, receiving a second local-oscillator signal from said modulator for providing a local oscillator output in phase and another 90° out of phase with said second local-oscillator signal;

a pair of balanced mixers, one said balanced mixer receiving the in-phase frequencies from said single sideband generator means and said quadrature hybrid means, and the second said balanced mixer receiving the 90° phase-shifted frequencies from said single sideband generator means and said quadrature hybrid means, for generating one second intermediate frequency in-phase with and one second intermediate frequency phase shifted by 90° from said in-phase frequencies;

a sum amplifier receiving outputs from each of said pair of balanced mixers, for generating the detected radar returns from one of said frequency channels;

a difference amplifier receiving outputs from each of said pair of balanced mixers, for generating the detected radar returns from the second of said frequency channels.

12. A method for determining the spectrum of capillary wave modulation patterns induced by ocean gravity waves comprising the steps of:

transmitting a pair of closely and variably spaced microwave frequencies;

generating a first local-oscillator frequency related to said transmitted frequencies;

shifting said first local-oscillator frequency;

coherently detecting radar returns of said pair of transmitted frequencies and utilizing said first localoscillator frequency in said coherent detection; and multiplying said coherently detected radar returns of both frequency channels to obtain a Bragg resonance.

* * * * *